C. G. BEWLEY.
MACHINE FOR MOLDING PLASTIC ARTICLES.
APPLICATION FILED AUG. 4, 1914.

1,185,968. Patented June 6, 1916.
4 SHEETS—SHEET 1.

Witnesses

Claude G. Bewley,
Inventor
by C. A. Snow & Co.
Attorneys

C. G. BEWLEY.
MACHINE FOR MOLDING PLASTIC ARTICLES.
APPLICATION FILED AUG. 4, 1914.

1,185,968.

Patented June 6, 1916.
4 SHEETS—SHEET 3.

Witnesses

Claude G. Bewley,
Inventor by C. A. Snow & Co.
Attorneys

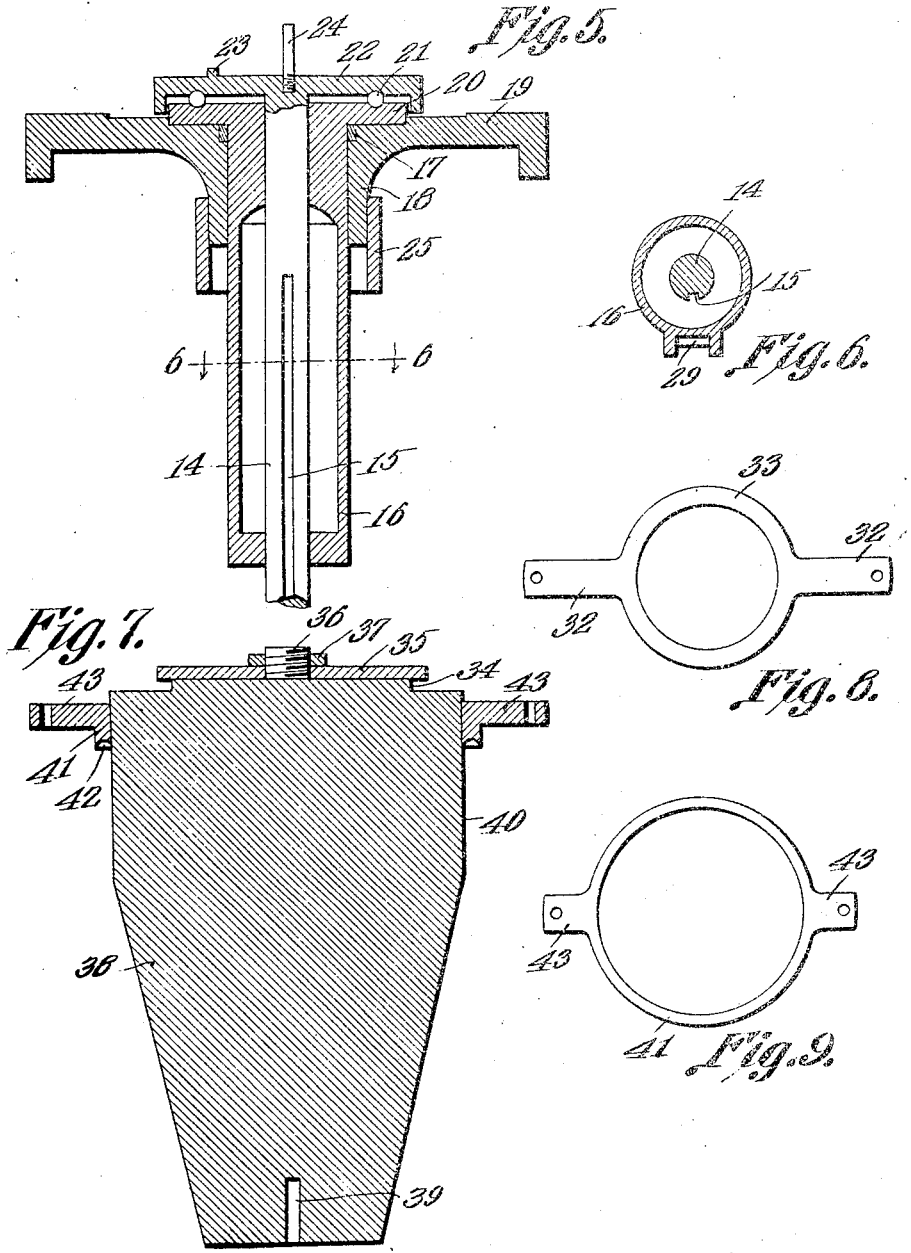

UNITED STATES PATENT OFFICE.

CLAUDE G. BEWLEY, OF SPOKANE, WASHINGTON.

MACHINE FOR MOLDING PLASTIC ARTICLES.

1,185,968.  Specification of Letters Patent.  Patented June 6, 1916.

Application filed August 4, 1914. Serial No. 854,986.

*To all whom it may concern:*

Be it known that I, CLAUDE G. BEWLEY, a citizen of the United States, residing at Spokane, in the county of Spokane and State of Washington, have invented a new and useful Machine for Molding Plastic Articles, of which the following is a specification.

The present invention relates to improvements in machines for molding plastic articles, the present invention being especially for molding concrete flower pots and saucers, one object of the invention being the provision of mechanism by means of which the members of the mold are rotated so that the poured cement concrete may be properly tamped during the filling of the mold and whereby the rim may be properly formed upon the pot or saucer after the final tamping.

A further object of the present invention is the provision of a machine of this character, in which the cement concrete is mixed, and delivered to the mold, the prime mover for the mixing means also being the prime mover for rotating the members of the mold so that the concrete will be properly delivered equally throughout the mold.

A still further object of the present invention is the provision of a tamping means operated from the prime mover for tamping the concrete after the same is delivered to the mold, thus properly packing the material therewithin so that a uniform thickness of pot or saucer will be formed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
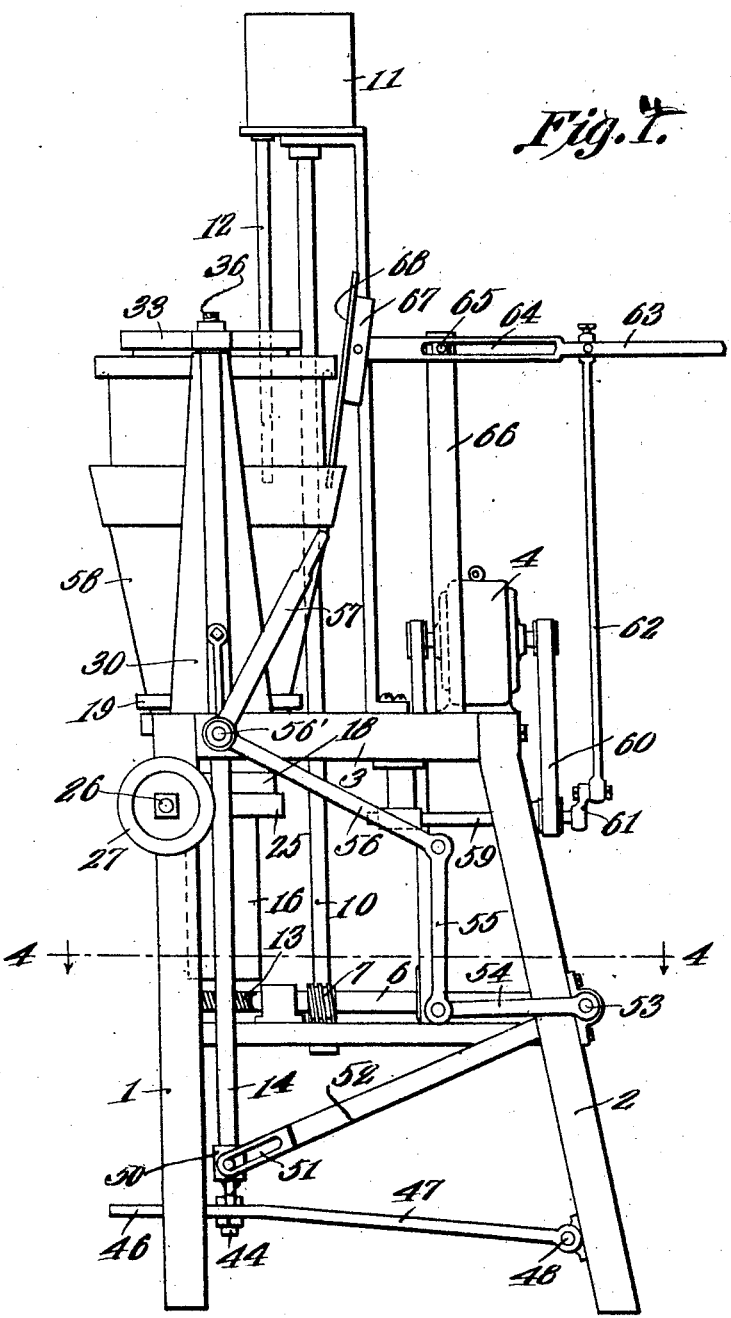
Figure 2:
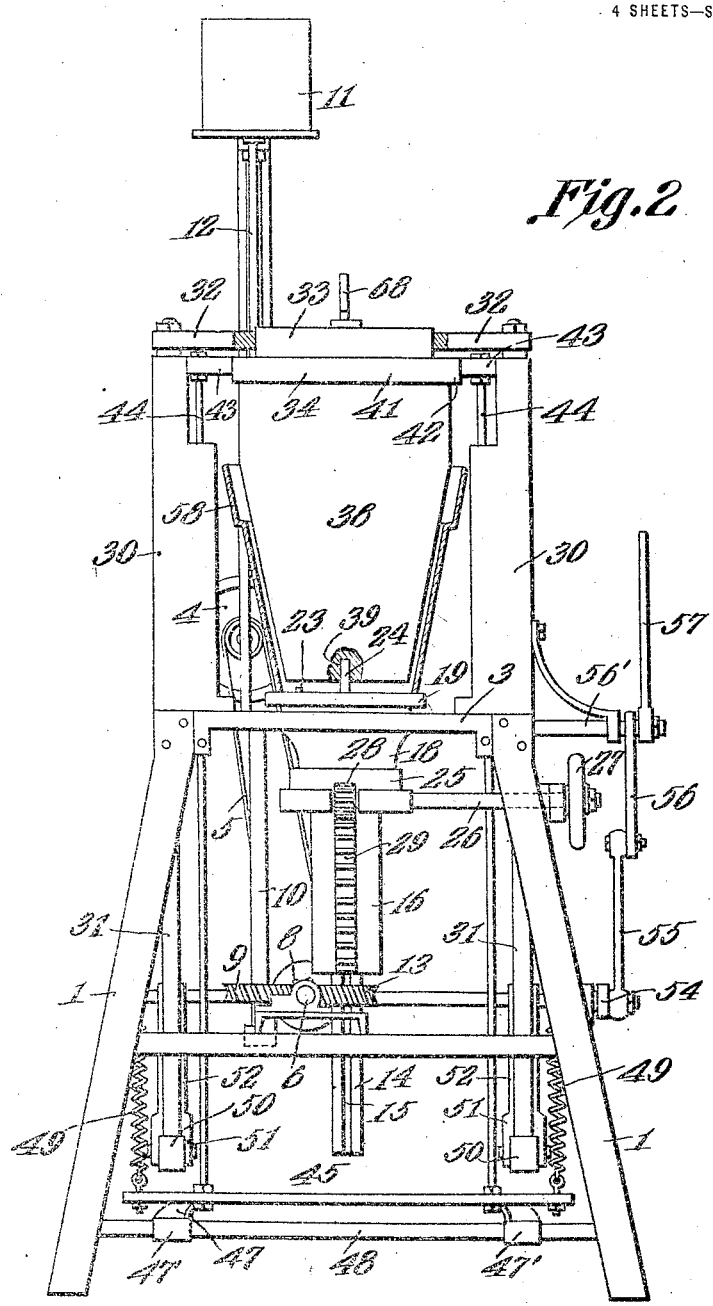
Figures 3, 4:
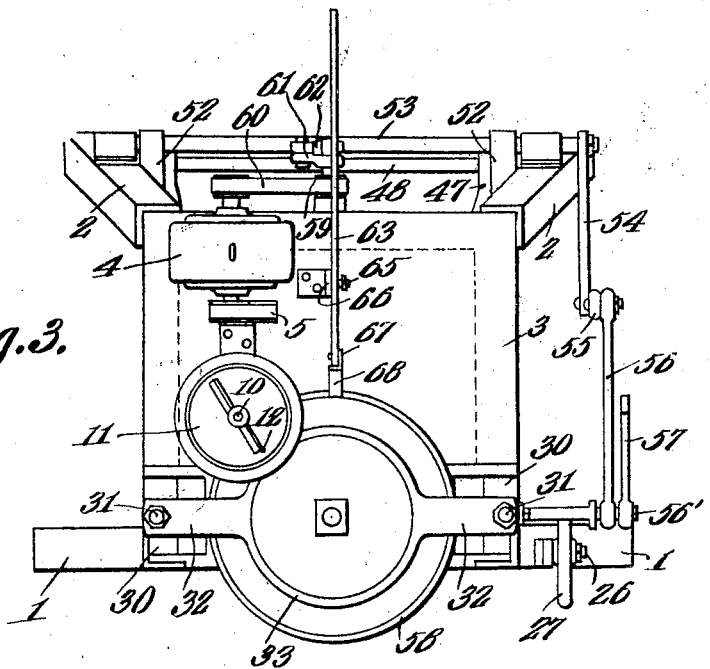

In the drawings—Figure 1 is a side elevation of the complete machine. Fig. 2 is a front elevation thereof. Fig. 3 is a top plan view thereof. Fig. 4 is a section taken on line 4—4 of Fig. 1. Fig. 5 is an enlarged detail sectional view through the female mold carrying means. Fig. 6 is a section taken in line 6—6 of Fig. 5. Fig. 7 is an enlarged detail sectional view of the male member of the mold showing the means for elevating and lowering the same and also the slidable means for forming the upper rim of the pot or saucer. Figs. 8 and 9 are top plan views respectively, of the male mold carrying member and the rim forming member of the machine.

Referring to the drawings, the numeral 1 designates the two front legs and 2 the two rear legs, of the main frame of the present device, a platform 3 being supported by the legs and constituting the support for the main mechanism of the mold and for the motor 4, the same in the present instance being shown as an electric motor. A belt 5 is operated by an electric motor 4, and operates the main shaft 6 of the present mechanism. Keyed upon this shaft, as clearly illustrated in Fig. 4, are the two worms 7 and 8, the worm 7 being in mesh with the horizontal worm gear 9 mounted upon the vertical shaft 10. This shaft 10 is extended upwardly and operates the concrete mixer 11, which is properly supported from the framework. Leading from the concrete mixer 11 is the flexible pipe 12, which directs the semiliquid concrete from the mixing receptacle 11 to the mold of the present mechanism. Meshing with the worm 8, is a horizontal worm gear 13, which is splined to the vertical shaft 14, by means of the keyway 15, said shaft 14 being capable of vertical sliding and rotary movements. Forming the journal for the vertical shaft 14, is a vertical cylindrical member 16, which is mounted for sliding movement and is held in place by the tightening collar 17 within the sleeve 18 of the female mold member carrying plate 19. The disk 20 disposed upon the upper end of the member 16 fits within the upper face of the plate 19, and carries the anti-frictional bearings 21 for the anti-frictional reception of the disk 22 at the upper end of the shaft 14 which constitutes a rotating support for the female mold 58, which in the present instance is shown in the form of a flower pot. A pin 23, is carried by the disk 22 and is disposed to engage the bottom of the mold 58, and forms a lock or key therewith, so that when the shaft 14 is rotated, the platform 22 will also rotate and consequently rotate therewith, the female mold 58 and the contents between it and the male mold member 38, as will presently appear. The centrally disposed pin 24 is carried by the platform 22, and forms the central hole through the bottom of the flower pot.

The sleeve 25 is fixed to the sleeve 18 for supporting the shaft 26 which is journaled in the frame and is operated by the hand lever 27, and through the pinion 28 and rack 29 which is carried by the member 16, elevates the member 16 and consequently the female mold carrying disk 22 and its support, so that with the present machine, deep or shallow flower pots and saucers may be properly molded or cast by simply adjusting parts according to the depth of the rims.

Upstanding from the platform 3 of the machine at the forward edge thereof adjacent the corners, are the two standards 30 and mounted therein and through the platform 3 for vertical sliding movement are the two rods 31, the upper ends of said rods being connected to the oppositely disposed members 32 of the male mold member carrying ring 33, the detail structure of which is shown in Figs. 2, 7 and 8. The ring 33 fits upon the reduced end 34 of the upper end of the male mold member 38, and by means of the disk 35 and the threaded boss 36 and nut 37, the parts are properly connected, so that the ring 33 will bodily move the male member 38 to and from the female mold member 58 when desired. Formed in the lower end of the mold member 38, is a socket 39 for the reception of the pin 24, the boss 36 and the pin 24 constituting a vertical axis for both mold members 38 and 58 so that when the platform 22 is rotated, both molds will be rotated and thus properly present the space therebetween for the reception of the poured concrete being directed from the flexible conduit 12 of the mixer 11. By this construction, the reduced end 34 and the ring 33 constitute the journal for the upper end of the male mold member 38 so that the same may rotate freely due to the engagement of the pin 23 with the mold 58. The rods 31 which are disposed vertically are slidable through the platform 3, and the means for adjusting said rods vertically is disposed below the platform. It will thus be seen that as the material is properly fed between the mold members, that the two members are rotated to receive the same and thus have the material equally distributed therebetween.

In order to provide a means for forming the rim upon the upper edge of the pot or saucer, the mold member 38 is provided with the cylindrical upper end 40 for the sliding reception of the rim forming ring member 41, said member 41 being capable of a vertical sliding movement relatively to the mold member 38, while such mold member is capable of being rotated within the ring or rim forming member 41. The downwardly projecting annular rim 42 of the ring 41 forms the upper edge of the pot or saucer while the oppositely disposed apertured lugs 43 constitute a means for connecting the rim forming member 41 to the upper ends of the two vertical rods 44, which extend downwardly through the frame and are connected to the cross bar 45 of the foot actuated treadle 46. This cross bar 45 is connected by means of the two rearwardly extending arms 47 to the shaft 48, so that the operator at the proper time may press downwardly upon the foot treadle 46 and consequently slide the rim forming member 41 downwardly upon the cylindrical portion 40 of the male mold member 38 and thus engage the upper portion of the concrete and form the rim of the pot. Two springs 49 are connected to the cross bar 45 and to the frame so as to normally hold the rim forming member 41 in its upward position, as clearly illustrated in Figs. 2 and 7. The vertical rods 44 are slidable through the platform 3 and the means for adjusting said rods 44 is located below said platform, the rods 44 being disposed adjacent or between the rods 31.

In order to provide a means for moving the male member 38 into and out of molding relation to the mold member 58, couplings 50 are mounted upon the lower ends of the rods 31, each of said couplings being operably connected to the slotted and bifurcated end 51 of its respective arm 52. These arms 52 are connected to the rock shaft 53, and through the arm 54, the link 55 and the bell crank lever 56, the rods 31 are operated for the purpose before set forth. The bell crank lever 56 is journaled at 56' to the frame and is provided with the hand lever 57, which when moved forwardly will elevate both the rods 31 and consequently move the mold member 38 for the proper reception of the material to form the bottom of the pot or saucer, the same being free to move downwardly and be disposed in the position as shown in Fig. 2, as the material is poured between the two mold members, and the mold members are rotated.

In order to provide a means for tamping the concrete as the same is supplied in the space between the two mold members, a short counter shaft 59 is journaled in the frame and is operably connected through a belt 60 to the motor 4, while a crank arm 61 being disposed upon one end thereof and through the rod 62 is connected for operating the adjustably mounted walking beam or lever 63. This walking beam 63 is provided with the slot 64 which is connected by means of the adjusting pin 65 located in the upper end of the support 66. Pivoted upon the opposite end of the walking beam 63 is a plate 67, which carries the tamping rod or paddle 68, preferably made of wood. The lower end is disposed as shown in Fig. 1, so that as the walking beam 63 is reciprocated due to the rotation of the shaft 59, the lower end of the tamping paddle 68 will be projected into the space between the two mold members 38 and 58 and as such action is imparted to the tamping member during the rotation of the two mold members and a feeding of the concrete by the spout 12 therebetween, it is evident that the material will be properly distributed and tamped simultaneously with the rotation of the mold members. By means of the adjustable connection at the slot 64 and pin 65, the position of the walking beam relatively to the support 66 may be readily determined so that the tamping member may be used in connection with wide or narrow articles. The sliding member 16 regulates the depth of the articles.

From the foregoing description, it is evident that with a machine of this character, that flower pots and other articles of a similar nature that it is desired to mold from a cement concrete, may be quickly formed in the desired shape, the molds being rotated during the filling and tamping thereof, so that the material is properly tamped and evenly distributed between such members, a rim forming means being so mounted in connection with the mold members as to form the rim upon the pots or saucers after the proper filling and tamping of the molds.

What is claimed is:

1. In a molding machine, a vertical shaft having a disk at its upper end, a female mold upon said disk and rotatable therewith, a vertical member through which said shaft is journaled and having a portion at its upper end supporting said disk, a support through which said member is slidable, means carried by the support for adjusting said member vertically, a rotatable male mold in the female mold, and means operatively connected with the said shaft below said member for rotating the shaft at various vertical positions thereof.

2. In a molding machine, a frame having a platform, a rotatable female mold upon said platform, a male mold within the female mold, a member to which the upper end of the male mold is rotatably engaged, a pair of opposite vertical rods slidable through the platform and having their upper ends attached to said member, means carried by the frame below the platform for adjusting rods vertically, a rim forming member in which the male mold is rotatable, a pair of opposite vertical rods slidable through the platform and having their upper ends attached to the rim forming member, the second mentioned pair of rods being disposed adjacent the first mentioned rods, and means carried by the frame below the platform for adjusting the second mentioned rods vertically.

In testimony that I claim the foregoing as my own, I have hereto affixed my signature in the presence of two witnesses.

CLAUDE G. BEWLEY.

Witnesses:
C. D. RANDALL,
B. B. ADAMS.